United States Patent [19]
Walters et al.

[11] 3,850,090
[45] Nov. 26, 1974

[54] POULTRY PROCESSING APPARATUS

[75] Inventors: Roger E. Walters, Trussville, Ala.;
William C. Reinke, University City, Mo.

[73] Assignee: Ralston Purina Company, St. Louis, Mo.

[22] Filed: Feb. 28, 1973

[21] Appl. No.: 336,856

[52] U.S. Cl. .................................................. 99/533
[51] Int. Cl. ...................... A22c 21/00, A22c 17/00
[58] Field of Search........ 17/1 C, 11 R; 99/532, 533; 128/214 R, 215, 214 F, 218 A; 27/24, 24 A; 222/81 X

[56] References Cited
UNITED STATES PATENTS

| | | | |
|---|---|---|---|
| 2,915,958 | 12/1959 | Rice | 99/532 |
| 3,035,508 | 5/1962 | Nelson | 99/533 |
| 3,080,809 | 3/1963 | Harris et al. | 99/532 |
| 3,149,555 | 9/1964 | Baum et al. | 99/532 X |
| 3,507,207 | 4/1970 | Rogers et al. | 99/532 |
| 3,511,164 | 5/1970 | Strandine et al. | 99/532 |
| 3,718,083 | 2/1973 | Walters | 99/532 |
| 3,734,001 | 5/1973 | Poster | 99/532 |

*Primary Examiner*—John W. Huckert
*Assistant Examiner*—Charles Gorenstein
*Attorney, Agent, or Firm*—Virgil B. Hill; Lawrence J. Hurst

[57] ABSTRACT

Apparatus is shown for injecting a material into a poultry product whereby simultaneous injection of the breast portion and the thigh and drum portion of the poultry carcass is achieved. Additionally, the injection assembly may be provided at a location remote from the pump and shut-off valve controlling the flow of material for the injection apparatus. The injection needles assembly includes a pair of spaced needles which are adapted for injecting both sides of the breast portion of the poultry carcass and a pair of actuation means connected thereto for urging the drum and thigh injection needles toward and away from the thigh and drum portion of the poultry carcass when the breast needles are inserted into the breast portion of the poultry carcass. The drum and thigh injection needles are provided at an angle of between 40° and 75° to the needles for injecting the breast portion of the poultry carcass.

9 Claims, 3 Drawing Figures

POULTRY PROCESSING APPARATUS

BACKGROUND OF THE INVENTION

The use of injection equipment for supplying a basting or flavoring material to poultry products is well known. However, the prior art equipment normally consisted of a needle unit which was suitable for hand operation but which was limited to a needle arrangement suitable only for injection of the breast portion of the carcass, or consisted of complex mechanical equipment having movable injection heads suitable for injecting both the breast and drum and thigh portions of poultry carcass. Further, these machines were not always accurate in their placement of needles, such that occasionally a needle would not be in the poultry product when the injection material was supplied thereto, resulting in the injection material being discharged into space. While the utilization of a hand operated needle assembly is convenient from a processing standpoint and produces a satisfactory product in that the breast portion of the poultry carcass may be injected with a suitable material, it is desirable and advantageous for certain commercial applications to inject not only the breast portion of the carcass but also the drum and thigh portion thereof. Additionally, with the complex mechanical equipment presently utilized wherein the carcass and drum and thigh portions of the poultry product may be injected difficulties arise in that the poultry product must be removed from a conveyor placed into a jig or fixture on the mechanical device for achieving the simultaneous injection of the breast and drum and thigh portion. Thus, it would be advantageous if the speed of operation of using a hand operated needle assembly could be coupled with the advantageous method of simultaneous injection of the breast and drum and thigh portion of a poultry carcass. Applicant has combined these two features by providing a needle assembly which may be readily manipulated by an operator and which contains provisions for injection needles that simultaneous supply injection material to the breast and thigh and drum portion of the poultry carcass. Additionally, means are provided on the needle assembly for controlling the quantity of injection material supplied to each of the injection needles.

SUMMARY OF THE INVENTION

Briefly, the present invention comprises an improved apparatus for injecting a material simultaneously into the breast and thigh and drum portions of a poultry carcass wherein a needle assembly is provided which includes a pair of needles spaced a predetermined distance and adapted for injecting both sides of the breast portions of the poultry carcass; a pair of arms are provided on the needle assembly at a predetermined angle to the breast injection needles; actuation means are provided on each of said arms with each of said actuation means having connected thereto at least one and preferably two injection needles for injecting the thigh and drum portion of the poultry carcass, and the arms are provided at a predetermined angle of between 40° - 75° to the breast injection needles such that the actuation means may urge the thigh and drum injection needles toward and away from the thigh and drum portion of the poultry carcass when the breast injection needles are inserted into the poultry carcass.

It is therefore the principal object of the present invention to provide a needle assembly for simultaneously injecting a basting or flavoring material into the breast and thigh and drum portions of a poultry carcass.

It is also an object of the present invention to provide a needle assembly which may be located at a position which is remote from the pump and control valve supplying the injection material to the assembly and in which the needle assembly may be readily manipulated by an operator.

Another object of the present invention is to provide a needle assembly which may be utilized by the operator for effecting the injection of the poultry carcass without the necessity of predeterminately positioning the poultry carcass in a fixture for achieving the simultaneous injection of the breast and thigh and drum portion of the poultry carcass. Further, the present apparatus consistently places the drum and thigh injection needles into the poultry product prior to injection material being supplied thereto to insure that the injection material is supplied to the poultry product and not discharged into space.

These and other objects and advantages of the present invention will become more apparent from the description which follows.

DESCRIPTION OF THE PREFERRED EMBODIMENTS

The present invention is concerned with an improved injection apparatus and more particularly with providing a needle assembly which may be located at a position remote from the control valve and pump supplying injection material to said needle assembly. The needle assembly has the desirable or advantageous feature that not only is the breast portion of the poultry product able to be injected but also suitable means are provided for the simultaneous injection of the drum and thigh area of the poultry product. The preferred use of the improved apparatus is for injecting a material into whole poultry products, such as turkey carcasses. In addition, the invention is concerned with permitting a predetermined quantity of material to be injected into the poultry product with portions of this predetermined quantity being metered to the breast area and simultaneously to the drum and thigh area of the carcass.

The materials to be injected may be selected from any of the group of materials which are normally injected into poultry products, especially aqueous materials, such as a basting material or a flavoring material. These materials are well known to those skilled in the art.

Figure 1:
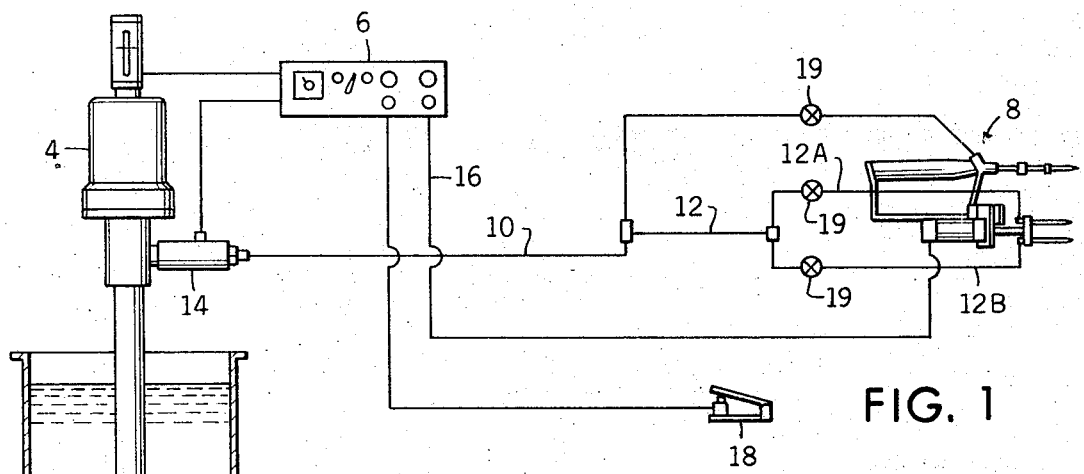
FIG. 1 is a schematic drawing of the injection apparatus embodying the present invention.

Referring now to FIG. 1, a tank 2 is utilized for holding a material to be injected into a poultry carcass. Preferably the material to be injected will be an aqueous solution for use as a basting or flavoring material for the poultry carcass. If desired, a cooling coil may be provided about the tank 2 for maintaining the injection material in a cool condition as it is held prior to injection. A sanitary pump 4 is provided within the tank for supplying the aqueous material to the needle assembly. The pump 4 is a standard pump which may be adjusted to supply a predetermined volume of injection material per stroke of the pump. Such pumps are commercially available from suppliers such as Graco Inc. and are well known in the art. A control panel 6 is utilized for controlling the number of cycles of the pump 4 and also for controlling the movement of the actuation means for moving the thigh and drum injection needles on the needle assembly indicated generally at 8. A hose 10 connects the pump 4 with the needle assembly 8. It should be noted that the hose 10 is provided with a branch 12 which further branches into flexible conduits 12A and 12B leading to the thigh and drum injection needles on the side of the needle assembly 8. It should be understood that a comparable arrangement of conduits for supplying injection material to the thigh and drum injection needles on the other side of the needle assembly 8 is provided. The hoses 10 and 12 should be flexible to allow for operator manipulation. A control or shut-off valve 14 is provided on the pump 4 with the hose 10 being connected to said valve. The control valve 14 serves as a fast acting high pressure cut-off valve to interrupt the flow of material from the pump 4 to the needle assembly 8. The shut-off valve 14 is controlled by the control panel 6 such that said valve is opened and closed substantially simultaneously with the operation of the pump 4. Additionally, an air line 16 is provided between the control panel 6 and actuation means on the needle assembly 8. The air line 16 serves to supply the air necessary to activate the actuation means on the needle assembly 8 for moving the thigh and drum injection needles thereon. The supply of air to the line 16 for the activation and deactivation of the thigh injection needles is also controlled by the control panel 6 and is adjusted such that these needles are moved substantially simultaneously with the activation of the pump 4 and the controlling of the shut-off valve 14. A foot switch 18 is connected to the control panel 6 such that activation of the foot switch serves to activate the pump 4 and open the shut-off valve 14 and additionally energize the thigh and drum injection needles on the needle assembly 8 moving the needles inward toward a poultry product and permitting material to be supplied from the tank 2 through the pump 4, control valve 14 and conduits 10 and 12 to the needle assembly 8 for supplying injection material to the breast and thigh and drum areas of the poultry product. This will be described in greater detail hereinafter. It should be understood that check valves 19 are provided in the conduits 10 and 12 to permit the injection material to flow to the needles when the pump 4 is activated, but prevent the material from leaking therefrom when the pump is deactivated. Additionally, it should be noted that the activation of the foot switch 18 starts the stroke counter for the pump 4 so that only a predetermined number of strokes of the pump 4 will be made. By limiting the strokes of the pump 4, a predetermined quantity of injection material may be supplied through the conduits 10 and 12 to the needle assembly 8. Upon completion of the desired number of strokes of the pump 4, the pump is deactivated and the shut-off valve 14 closed to interrupt the flow of material from the tank 2 to the needle assembly 8. Additionally, the control panel 6 deactivates the line 16 which serves to move the thigh and drum injection needles to their de-activated or retracted position. The check valves 19 are effective in preventing the leakage of injection material from the breast injection needles and the thigh and drum injection needles.

Figure 2:
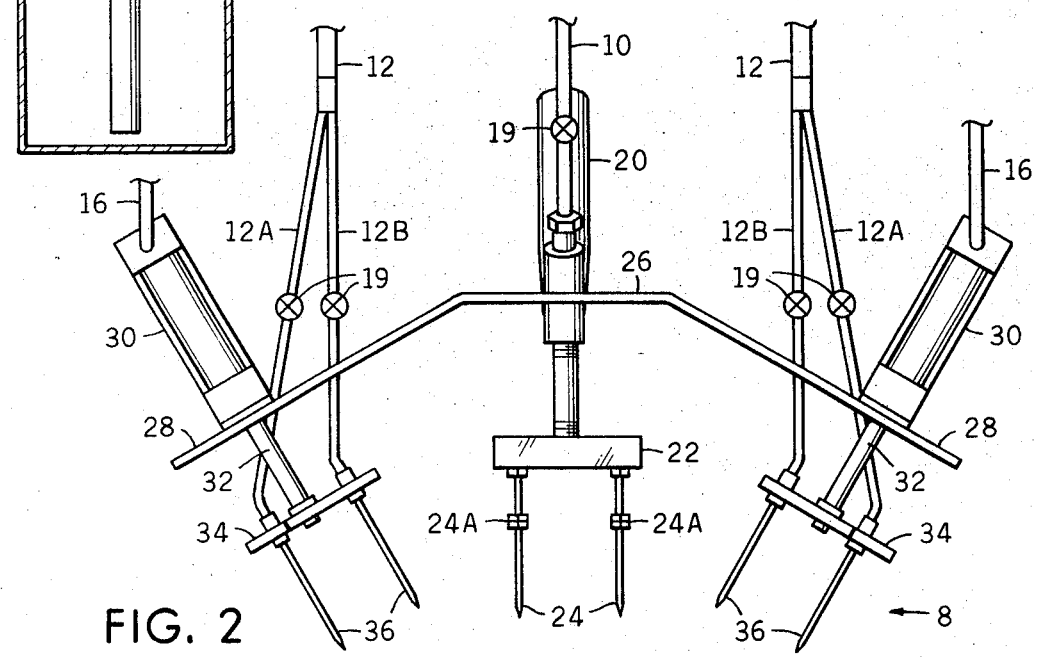
FIG. 2 is a top view of the needle assembly of the present invention.
Figure 3:
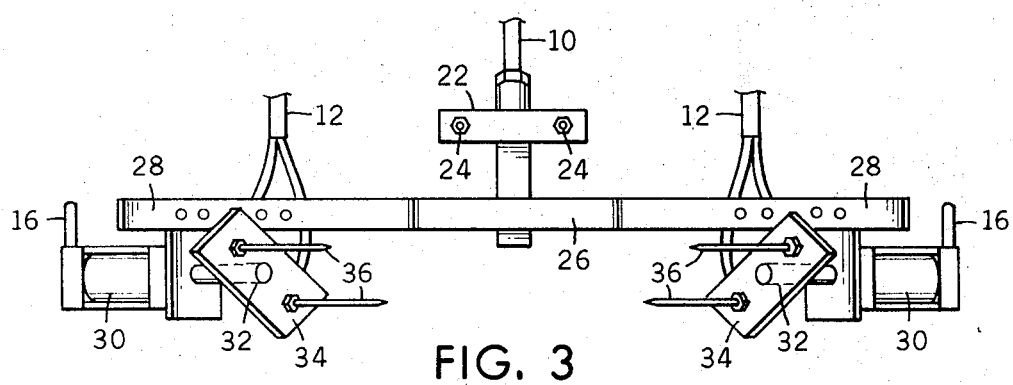
FIG. 3 is a front view of the needle assembly of FIG. 2.

Referring now to FIGS. 2 and 3 the needle assembly indicated generally at 8 is shown in greater detail. Particularly the needle assembly 8 consists of a handle member 20 which has connected thereto a manifold member 22. The manifold member 22 is connected to the conduit 10 and is adapted for receiving a pair of breast injection needles 24 therein. The injection needles 24 are predeterminately positioned or adapted to be received in each side of the breast portion of a poultry carcass. Preferably, the manifold member 22 is shaped to position the needles 24 in a position advanced from the handle 20, as best seen in FIG. 2. This permits the use of shorter needles for the breast injection. If desired, set-screw collars 24A may be provided on the needles 24 for controlling the depth of penetration of the needles within the poultry product and also for better position of the needle assembly with respect to the poultry product to be certain that the thigh and drum injection needles penetrate the poultry product. The handle member 20 is also provided with a portion 26 which is perpendicular to the breast injection needles 24 and which extends for a distance approximately equal to the distance between the needles 24. A pair of arm members 28 are connected to the handle portion 26 and are provided at a predetermined angle to the breast injection needles 24. This angle may be within the range of 40° – 75° to the breast injection needles 24. Desirably the arms 28 will be provided at an angle of about 60° to the breast injection needles 24. Preferably, the arms 28 will be provided at a position below the manifold member 22 and needles 24 with this distance desirably being approximately 2 – 3 inches below the needles 24.

Actuation means or a positive actuation air cylinder 30 is provided on each of the arms 28 and perpendicular thereto. The air cylinders 30 may be attached to the arms 28 by any suitable means such as being bolted thereto. Desirably, a plurality of openings will be provided along the arms 28 for receiving the bolts so that the spacing of the air cylinder may be adjusted to accommodate various sized poultry carcasses. Attached to the push rod portion 32 of each of these air cylinders 30 is a plate 34 which is adapted for receiving drum and thigh injection needles 36. Each of the plates 34 are provided with at least one thigh and drum injection needle and preferably contain two such needles. The plates 34 are also provided with a connector means for connecting the thigh and drum injection needles 36 with the branch supply conduits 12A and 12B of the conduit 12. Additionally, the air cylinders 30 are provided with means connecting said cylinders to the conduit 16 such that the control panel 6 may activate and deactivate the air cylinders. As best seen in FIG. 3, the plates 34 may be adjusted to position the drum and thigh injection needles 36 in the desired position for injecting the poultry carcass.

In the operation of the present needle assembly, the operator inserts the breast injection needles 24 into the breast portion of the poultry carcass. The operator then activates the foot valve 18 which energizes the control panel 6. The control panel 6 supplies air through the conduit 16 to energize or activate the actuation means 30 and urge the thigh and drum injection needles 36 into the poultry product. The control panel 6 then activates the pump 4 and opens the shut off valve 14 which serves to supply the injection material from the tank 2 to the needle assembly 8. The pump 4 is operated for the desired number of strokes as set on the control panel 6 to supply the desired quantity of injection material through the breast needles 24 and the thigh and drum needles 36. Thereafter the pump 4 is deactivated, the shut-off valve 14 closed and the actuation means 30 deactivated by the air supply 16 to urge the thigh and drum needles 36 to their at rest position. Since the material being injected is injected against a back pressure (the poultry product), the completion of the pumping cycle and closure of the control valve 14 serves to trap the injection material within the needle assembly 8 and the flexible conduits 10 and 12. The check valves 19 and the capillary action of the injection material in the injection needles are effective to prevent leakage of the injection material from the needle assembly 8 when the injection needles are withdrawn from the poultry product.

In view of the foregoing, it is now apparent that applicants have disclosed a novel injection apparatus meeting the objects and advantages heretofore set forth and that obvious modifications and changes may be made in the injection apparatus without departing from the spirit of the invention.

We claim:

1. Apparatus for simultaneously injecting a material into the breast and thigh and drum portion of a poultry carcass comprising: a needle assembly for injecting the material into the poultry carcass connected to a source of injection material, said needle assembly including a pair of spaced needles adapted for injecting both sides of the breast portion of a poultry carcass, a pair of opposed arms on said needle assembly each at a predetermined angle to said pair of breast injection needles, and actuation means on each of said arms responsive to an applied force for movement toward and away from said poultry carcass when said breast injection needles are inserted into the poultry carcass, each of said actuation means having connected thereto at least one injection needle adapted for injecting the thigh and drum portion of the poultry carcass.

2. The apparatus according to claim 1 wherein the arms on said needle assembly are provided at an angle of between 40° to 75° to the breast injection needles.

3. The apparatus according to claim 1 wherein the actuation means comprises a positive displacement air cylinder connected to each of said arms for urging the thigh injection needle toward and away from said carcass.

4. The apparatus according to claim 3 wherein said actuation means and the injection needle connected thereto are provided at a 90° angle to said arm and adjustable by movement along the length of said arms.

5. Apparatus for simultaneously injecting a material into the breast and thigh and drum portions of a poultry carcass comprising: a frame having a pair of spaced needles adapted for injecting both sides of the breast portion of a poultry carcass, said frame having a portion spaced a predetermined distance beneath said breast injection needles and including arms positioned at a predetermined angle to said breast injection needles, a pair of actuation means on said arms responsive to an applied force, at least, one injection needle connected to each of said actuation means and movable in response thereto for injecting the thigh and drum portion of the poultry carcass and each of said needles being connected to a source of injection material.

6. The apparatus according to claim 5 wherein said actuation means comprises a positive displacement air cylinder connected to said arm.

7. The apparatus according to claim 5 wherein said portion of said frame is approximately 2 - 3 inches beneath said breast injection needles and said arms are at an angle of between approximately 40° - 75° to said breast injection needles.

8. Apparatus for simultaneously injecting a material into the breast and thigh and drum portions of a poultry carcass comprising: a pump connected to a source of injection material, a control valve connected to said pump for controlling the flow of injection material, a needle assembly for simultaneously injecting the material into the breast and thigh and drum portions of a poultry carcass, a flexible hose connecting said needle assembly to said control valve, said needle assembly including a manifold member having a pair of spaced needles adapted for injecting the material into both sides of the breast portion of a poultry carcass, said needle assembly including a support member beneath said manifold and having arms thereon at a predetermined angle to said spaced needles, a pair of actuation means on said arms, each of said actuation means having connected thereto, at least, one injection needle adapted for injecting the thigh and drum portion of said carcass and each of said needles being connected to said hose at said needle assembly, a check valve in said hose at each of said needles to prevent leakage of injection material when said needles are not in the poultry carcass and means controlling the quantity of injection material supplied to said needle assembly, said means also controlling the movement of said actuation means.

9. The apparatus according to claim 8 wherein the arms on said needle assembly are provided at an angle of between 40° - 75° to the breast injection needles.

* * * * *